United States Patent
Saitou (10) Patent No.: US 11,986,735 B2
(45) Date of Patent: May 21, 2024

(54) NON-TRANSITORY COMPUTER-READABLE MEDIUM AND VIDEO GAME PROCESSING SYSTEM

(71) Applicant: SQUARE ENIX CO., LTD., Tokyo (JP)

(72) Inventor: Chikara Saitou, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 88 days.

(21) Appl. No.: 17/659,559

(22) Filed: Apr. 18, 2022

(65) Prior Publication Data
US 2022/0331697 A1    Oct. 20, 2022

(30) Foreign Application Priority Data
Apr. 19, 2021 (JP) .................. 2021-070630

(51) Int. Cl.
| | | |
|---|---|---|
| *A63F 13/00* | (2014.01) | |
| *A63F 13/45* | (2014.01) | |
| *A63F 13/537* | (2014.01) | |
| *A63F 13/56* | (2014.01) | |
| *A63F 13/69* | (2014.01) | |
| *A63F 13/837* | (2014.01) | |

(52) U.S. Cl.
CPC .............. *A63F 13/69* (2014.09); *A63F 13/45* (2014.09); *A63F 13/537* (2014.09); *A63F 13/56* (2014.09); *A63F 13/837* (2014.09)

(58) Field of Classification Search
CPC ........... A63F 13/45; A63F 13/55; A63F 13/56
See application file for complete search history.

(56) References Cited

U.S. PATENT DOCUMENTS

| | | | | |
|---|---|---|---|---|
| 2011/0319148 A1* | 12/2011 | Kinnebrew | ............ | G06V 20/42 463/43 |
| 2012/0077585 A1* | 3/2012 | Miyamoto | .............. | A63F 13/25 463/31 |
| 2015/0086183 A1* | 3/2015 | Sterchi | ................... | G11B 27/34 386/286 |

FOREIGN PATENT DOCUMENTS

JP    2013131119 A    7/2013

OTHER PUBLICATIONS

Just Cause 4 Grapple Hook Air Lifter https://youtu.be/m3pe_YHYsEM?si=A2U85dSrHp6AOj-7 (Year: 2018).*

* cited by examiner

*Primary Examiner* — David L Lewis
*Assistant Examiner* — Eric M Thomas
(74) *Attorney, Agent, or Firm* — Dorsey & Whitney LLP (57) ABSTRACT

A non-transitory computer-readable medium storing a video game processing program for causing a server to perform functions to control progress of a video game according to an operation of a player is provided. The functions comprise: ejecting an object from a position corresponding to the player in a virtual space based on the operation of the player; determining whether to update a degree of uplift of a predetermined region based on a positional relation between the ejected object and the predetermined region in the virtual space referring to storage storing uplift information related to the degree of uplift of the predetermined region and updating the uplift information according to a first update rule related to the object and the predetermined region.

10 Claims, 8 Drawing Sheets

NON-TRANSITORY COMPUTER-READABLE MEDIUM AND VIDEO GAME PROCESSING SYSTEM

CROSS-REFERENCE TO RELATED APPLICATION

The present application claims priority to and the benefit of Japanese Patent Application No. 2021-070630 filed on Apr. 19, 2021, the disclosure of which is expressly incorporated herein by reference in its entirety for any purpose.

BACKGROUND

At least one of embodiments of the present disclosure relates to a video game processing program and a video game processing system for causing a server to realize a function of controlling the progress of a video game according to operation of a player.

In the field of video games, there have been proposed various systems for advancing, based on operation of a player, a video game in which a virtual space is used.

As such systems, for example, there is a system in which a player character advances a video game by launching a predetermined object and fighting against an enemy character while moving on a battle field in a three-dimensional virtual space. Examples of such systems may be found in Japanese Patent Application Publication No. 2013-131119 A.

SUMMARY

Incidentally, in a video game that progresses as the position of a player moves on a predetermined region in a virtual space, a position to which the player can move in the virtual space is determined in advance and is not changed by the intention of the player. Therefore, amusement of the video game is sometimes deteriorated because the video game causes the player to feel that the video game lacks variations.

An object of at least one embodiment of the present disclosure is to solve the above problems and improve amusement of a video game.

According to a non-limiting aspect of the present disclosure, there is provided a non-transitory computer-readable medium storing a video game processing program for causing a server to perform functions to control progress of a video game according to operation of a player.

The functions include an ejecting function configured to eject an object from a position corresponding to the player in a virtual space based on the operation of the player.

The functions also include a determining function configured to determine whether to update a degree of uplift of the predetermined region based on a positional relationship between the ejected object and a predetermined region in the virtual space.

The functions also include an updating function configured to update referring to a storage storing uplift information related to the degree of uplift of the predetermined region, when it is determined to update the degree of uplift and updating the uplift information according to a first update rule related to the object and the predetermined region.

According to another non-limiting aspect of the present disclosure, there is provided a video game processing system according to an embodiment of the present disclosure is a video game processing system that includes a communication network, a server, a player terminal, one or more processors configured to controls progress of a video game according to an operation of a player.

The processors comprised in the video game processing system eject an object from a position corresponding to the player in a virtual space based on the operation of the player.

The processors comprised in the video game processing system also configured to determine whether to update a degree of uplift of the predetermined region, based on a positional relation between the ejected object and the predetermined region in the virtual space.

The processors comprised in the video game processing system also includes configured to, when it is determined to update the degree of uplift, refer to an uplift information storage storing uplift information related to the degree of uplift of the predetermined region and update the uplift information according to a first update rule related to the object and the predetermined region.

According to still another a non-limiting aspect of the present disclosure, there is provided a non-transitory computer-readable medium storing a video game processing program for causing a player terminal to perform functions to control progress of a video game according to operation of a player.

The functions include an ejecting function configured to eject an object from a position corresponding to the player in a virtual space based on the operation of the player.

The functions also include a determining function configured to determine whether to update a degree of uplift of a predetermined region based on a positional relation between the ejected object and the predetermined region in the virtual space.

The functions also include an updating function configured to update referring to a storage storing uplift information related to the degree of uplift of the predetermined region, when it is determined to update the degree of uplift and updating the uplift information according to a first update rule related to the object and the predetermined region.

One or more deficiencies are solved by the embodiments of this application.

BRIEF DESCRIPTION OF DRAWINGS

The foregoing and other objects, features and advantages of the present disclosure will become more readily apparent from the following detailed description of preferred embodiments of the present disclosure that proceeds with reference to the appending drawings.

DETAILED DESCRIPTION

An example of an embodiment of the present disclosure is explained below with reference to the drawings. Note that various constituent elements in the examples of the embodiments explained below can be combined as appropriate as long as no contradiction or the like occurs. Explanation of content explained as an example of a certain embodiment is sometimes omitted in other embodiments. The content of operations and processing not related to the characteristic portions of the embodiments is sometimes omitted. Further, the order of various kinds of processing constituting various flows explained below is random as long as no contradiction or the like occurs in processing content.

First Embodiment

Figure 1:
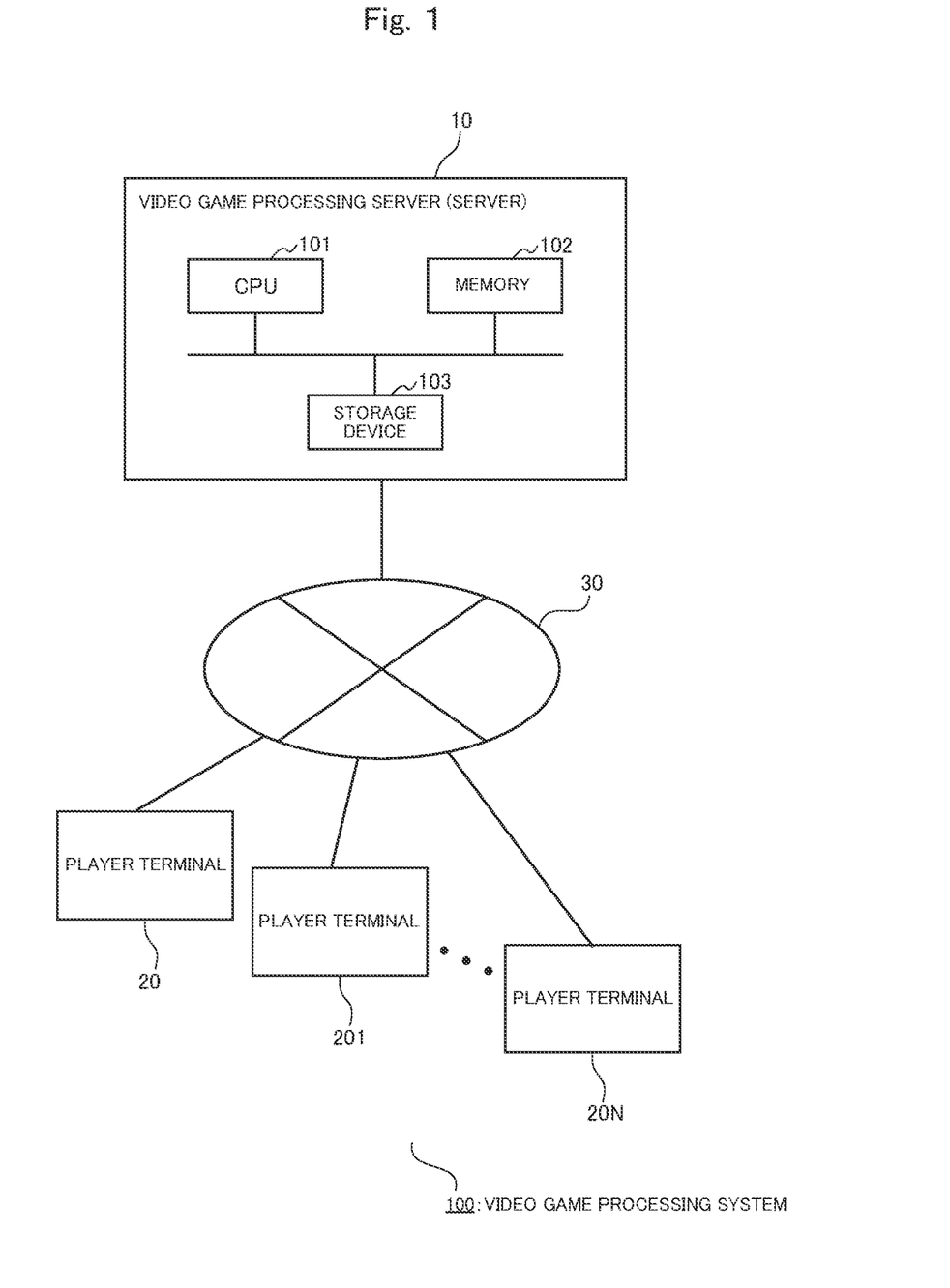
FIG. 1 is a block diagram illustrating an example of a configuration of a video game processing system corresponding to at least one of embodiments of the present disclosure

FIG. 1 is a block diagram illustrating an example of a configuration of a video game processing system 100 in an embodiment of the present disclosure. As illustrated in FIG. 1, the video game processing system 100 includes a video game processing server 10 (a server 10) and player terminals (player terminals) 20 and 201 to 20N (N is any integer) used by players (players) of the video game processing system 100. Note that the configuration of the video game processing system 100 is not limited this. A single player terminal may be used by a plurality of players or the video game processing system 100 may include a plurality of servers.

The server 10 and the plurality of player terminals 20 and 201 to 20N are connected to a communication network 30 such as the Internet. Note that, although not illustrated, the plurality of player terminals 20 and 201 to 20N are connected to the communication network 30 by performing, through a wireless communication line, data communication with a base station managed by a communication company.

The video game processing system 100 includes the server 10 and the plurality of player terminals 20 and 201 to 20N, thereby realizing various functions for executing various kinds of processing according to operation of the players.

The server 10 is managed by an administrator of the video game processing system 100 and has various functions for providing information concerning various kinds of processing to the plurality of player terminals 20 and 201 to 20N. In the present example, the server 10 is configured by an information processing device such as a WWW server and includes a storage medium that stores various kinds of information. The configuration of the server 10 is not particularly limited if the server 10 includes general components for performing various kinds of processing as a computer such as a control unit and a communication unit. An example of a hardware configuration of the server 10 is briefly explained below.

As illustrated in FIG. 1, the server 10 includes at least a central processing unit (CPU) 101, a memory 102, and a storage device 103.

The CPU 101 is a central processing unit that performs various calculations and controls. When the server 10 includes a graphics processing unit (GPU), a part of the various calculations and controls may be performed by the GPU. The server 10 executes, with the CPU 101, various kinds of information processing necessary for controlling a video game using data read out to the memory 102 as appropriate and causes the storage device 103 to store obtained processing results according to necessity.

The storage device 103 has a function of a storage medium that stores various kinds of information. The configuration of the storage device 103 is not particularly limited. However, from the viewpoint of reducing processing loads respectively applied to the plurality of player terminals 20 and 201 to 20N, it is preferable that the storage device 103 is configured to be capable of storing all of various kinds of information necessary for controlling the video game. Examples of the storage device 103 include a HDD and an SSD. However, the storage storing various kinds of information at least includes a storage region in a state accessible by the server 10. For example, the storage may include a dedicated storage region on the outside of the server 10.

Figure 2:
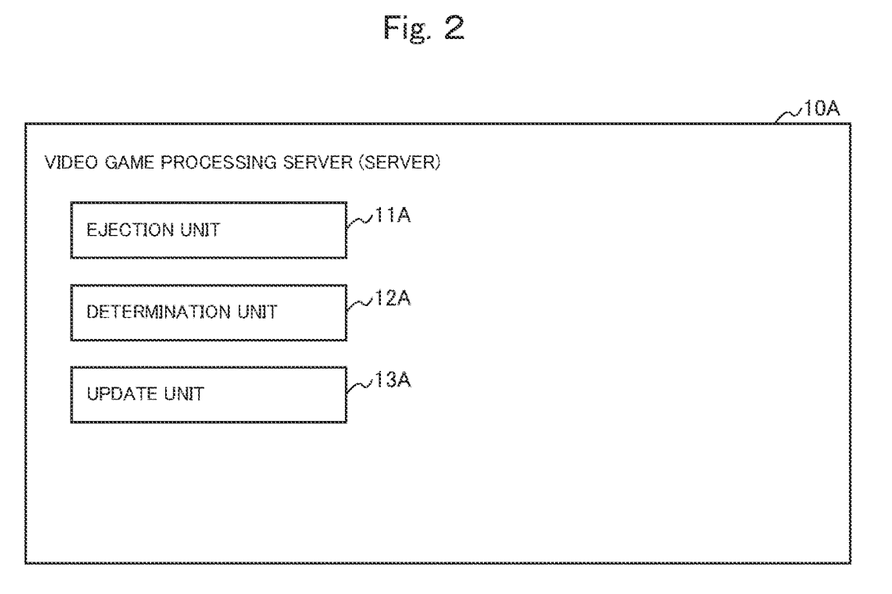
FIG. 2 is a block diagram illustrating a configuration of a server corresponding to at least one of the embodiments of the present disclosure.

FIG. 2 is a block diagram illustrating a configuration of a video game processing server 10A (a server 10A), which is an example of the configuration of the video game processing server 10. As illustrated in FIG. 2, the server 10A includes at least an ejection unit 11A, a determination unit 12A, and an update unit 13A.

The ejection unit 11A has a function of ejecting an object from a position corresponding to a player in a virtual space based on operation of the player.

The operation of the player means input operation on the player terminal 20 by the player. The operation of the player is not particularly limited but is preferably input operation concerning the progress of the video game by the player. Examples of the operation of the player include input operation concerning a player character displayed on a game screen.

The virtual space means a virtual space used for the progress of the video game. Examples of the virtual space include a virtual space in which a player character of the video game appears.

The position corresponding to the player in the virtual space is not particularly limited but is preferably a position recognized by the player as corresponding to the player. Examples of the position corresponding to the player include a visual point position of the player and a position corresponding to the player character in the virtual space.

Ejecting an object means moving an object in a predetermined position from the position. A configuration for ejecting an object is not particularly limited and may be a configuration for generating an object in the predetermined position and moving the object or may be a configuration for moving an object in the predetermined position already generated in the virtual space. Examples of the configuration for ejecting an object include a configuration for moving an object from a position corresponding to the player character in a direction or to a position decided based on operation of the player.

In addition, the object is not particularly limited and is preferably an object that can favor the player in the progress of the video game. Examples of the object include an object that can contribute to achievement of a goal imposed on the player in the video game.

The determination unit 12A has a function of determining, based on a positional relation between the ejected object and the predetermined region in the virtual space, whether to update a degree of uplift of the predetermined region.

The predetermined region in the virtual space means a region set in advance in the virtual space. The predetermined region in the virtual space is not particularly limited but is preferable a region set in the virtual space and recognizable by the player. Examples of the predetermined region in the virtual space include at least a part of a region on the ground in the virtual space.

Determining based on the positional relation between the object and the predetermined region means that a relation between the position of the object and the position of the predetermined region is used for at least part of processing. A configuration for using the relation between the position of the object and the position of the predetermined region for at least part of the processing is not particularly limited but preferably a configuration for using a relation between information indicating the position of the object and information indicating the position of the predetermined region for at least part of the processing.

The degree of uplift of the predetermined region means a degree of uplift with respect to a reference surface of the predetermined region (for example, surfaces of regions indicated by the game field at the start of the game). The degree of uplift of the predetermined region is not particularly limited and may be a degree of uplift at each position in the predetermined region or a degree of a uplift in each unit region in the predetermined region. The unit region means a region having breadth serving as a unit for deciding the degree of uplift in the predetermined region. Note that examples of content indicating the degree of the uplift include a distance from a predetermined position and height from a predetermined surface.

The update unit 13A has a function of, when it is determined to update the degree of uplift, referring to an uplift information storage storing uplift information related to the degree of uplift of a predetermined region and updating the uplift information according to a first update rule related to the object and the predetermined region.

The uplift information means information related to the degree of uplift of the predetermined region. The uplift information is not particularly limited, but is preferably includes a predetermined region and the degree of uplift are associated with each other. Examples of the uplift information include information in which positions in the predetermined region and degrees of uplift in association and information in which unit regions in the predetermined region and the degrees of uplift in association. Note that the degree of uplift in the uplift information is managed by, for example, a numerical value.

The first update rule means a rule related to the object and the predetermined region, the rule being used to update the uplift information. The first update rule is not particularly limited but is preferably a rule for specifying, based on the positional relation between the object and the predetermined region, a region where the degree of uplift is updated (an update region) in the predetermined region. Examples of the first update rule include a rule for specifying, as the update region, in the predetermined region, a contact region or a peripheral region of the object in the case where the determination unit 12A determines to update the degree of uplift of the predetermined region.

Updating the uplift information means changing at least part of the uplift information. The update content of the uplift information is determined according to the first update rule. When the update region is specified from the predetermined region according to the first update rule, information related to positions and unit regions included in the update region in the uplift information is updated.

The plurality of player terminals 20 and 201 to 20N are respectively configured by communication terminals managed by the player and capable of performing a network distribution type game such as a cellular phone terminal, a personal digital assistant (PDA), a portable game device, or a so-called wearable device. Note that the configuration of the player terminal that can be included in the video game processing system 100 is not limited to the example explained above. The configuration of the player terminal allows the player to at least recognize the content of the video game. Other examples of the configuration of the player terminal include a combination of various communication terminals, a personal computer, and a stationary game device.

The plurality of player terminals 20 and 201 to 20N respectively include hardware (for example, a display device that displays a browser screen or a game screen corresponding to a coordinate) and software for executing various kinds of processing by being connected to the communication network 30 and communicating with the server 10. Note that each of the plurality of player terminals 20 and 201 to 20N may be configured to be able to directly communicate with one another not via the server 10.

Next, an operation of the video game processing system 100 (the system 100) of the present example is explained.

Figure 3:
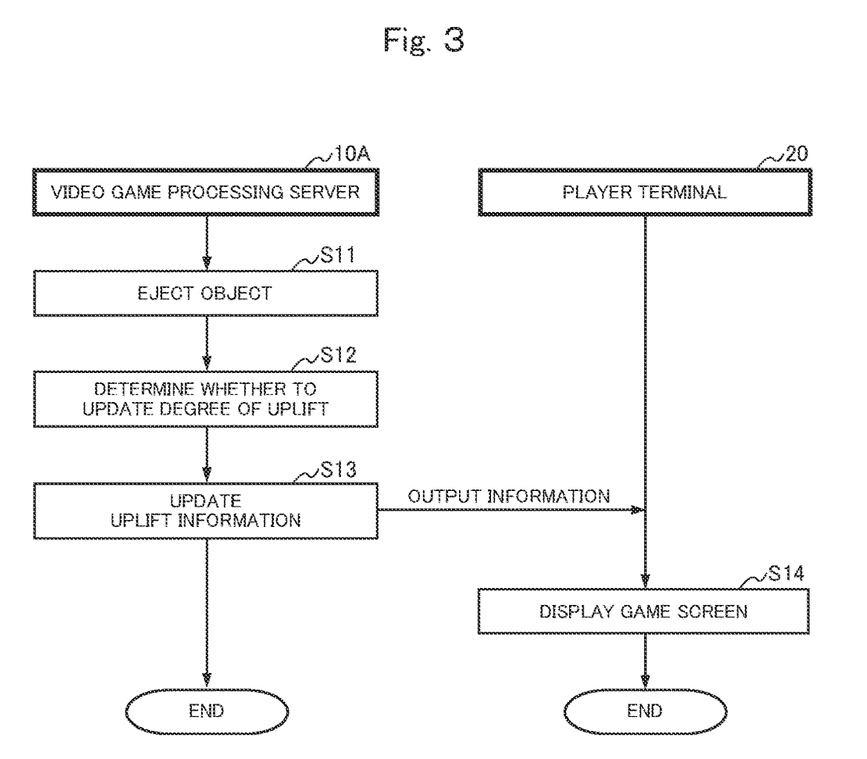
FIG. 3 is a flowchart illustrating an example of game processing corresponding to at least one of the embodiments of the present disclosure.

FIG. 3 is a flowchart illustrating an example of game processing executed by the system 100. In the game processing in the present example, processing related to controlling the progress of the video game is performed according to operation of the player of the player terminal 20 (the terminal 20) is performed. In the following explanation, an example is explained in which the server 10A and the terminal 20 execute the game processing.

The game processing is started, for example, when the terminal 20 accessing the server 10A requests the server 10A to display a virtual space.

In the game processing, first, the server 10A ejects an object from a position corresponding to the player in the virtual space based on operation of the player (step S11). In the present example, the server 10A ejects, based on operation of the player, the object from the position of a player character in a direction in which the player character faces.

After ejecting the object, the server 10A determines, based on a positional relation between the object and a predetermined region in the virtual space, whether to update a degree of uplift of the predetermined region (step S12). In the present example, the server 10A determines to update the degree of uplift of the predetermined region when the ejected object comes into contact with any position in the predetermined region.

When determining to update the degree of uplift, the server 10A refers to the uplift information storage storing the uplift information related to the degree of uplift of the predetermined region and updates the uplift information according to the first update rule related to the object and the predetermined region (step S13). In the present example, the server 10A specifies, based on the information in which the unit regions in the predetermined region and the degrees of uplift are associated serving as the uplift information, as an update region, a peripheral region of the object in the case where it is determined to update the degree of uplift of the predetermined region and updates information related to the unit regions included in the specified update region. The server 10A transmits output information related to the update of the information related to the predetermined region to the terminal 20.

As explained above, as one aspect of the first embodiment, the server 10A that controls the progress of the video game according to the operation of the player includes the ejection unit 11A, the determination unit 12A, and the update unit 13A. Therefore, it is possible to eject the object from the position corresponding to the player in the virtual space based on the operation of the player, determine whether to update the degree of uplift of the predetermined region based on the positional relation between the ejected object and the predetermined region in the virtual space, and, when it is determined to update the degree of uplift, refer to the uplift information storage storing the uplift information related to the degree of uplift of the predetermined region, update the uplift information according to the first update rule related to the object and the predetermined region, and improve amusement of the video game.

That is, since the predetermined region of the virtual space can be changed according to the intention of the player, the virtual space becomes rich in variation, and as a result, amusement of the video game can be improved. For example, since the position to which the player can move in the virtual space can be changed by the intention of the player according to the uplift of the predetermined region, consideration about the change is added as an element of the game play, and as a result, amusement of the video game can be improved.

Second Embodiment

Figure 4:
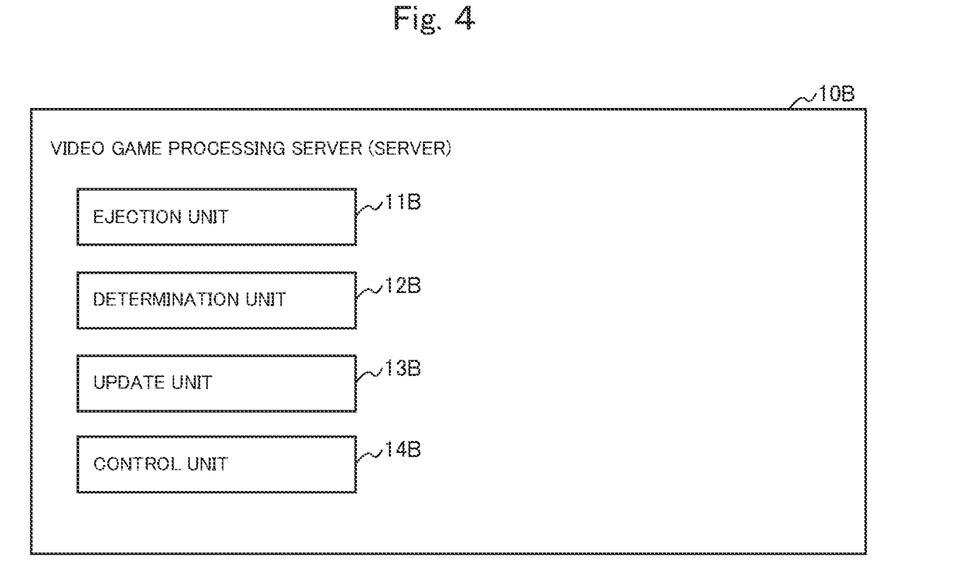
FIG. 4 is a block diagram illustrating a configuration of a server corresponding to at least one of the embodiments of the present disclosure.

FIG. 4 is a block diagram illustrating a configuration of a video game processing server 100 (a server 10B), which is an example of the video game processing server 10 in the system 100 (see FIG. 1). In the present example, the server 10B includes at least an ejection unit 11B, a determination unit 12B, an update unit 13B, and a control unit 14B.

The ejection unit 11B has a function of ejecting an object from a position corresponding to a player in a virtual space based on operation of the player.

The operation of the player means input operation to the terminal 20 by the player. In the present example, the operation of the player is input operation related to at least a player character.

The virtual space means a virtual space used for the progress of the video game. In this example, the virtual space is a virtual three-dimensional space (a three-dimensional virtual space).

The video game in this example is an action shooting game in which player groups battle each other. The groups secure regions on the ground of a field provided in the three-dimensional virtual space and compete for the sum of degrees of uplift (volumes of mountains formed by uplift) of the regions. Players operate their own player characters. The player characters carry guns. When ejection instruction operation of the player is performed, a bubble is ejected from the gun carried by the player character. When the bubble lands on the ground, a predetermined range centering on a position of the ground where the bubble has landed changes to a region of the group of the player character that has ejected the bubble and uplifts.

The position corresponding to the player in the virtual space is not particularly limited but is preferably a position where the player can recognize that the position corresponds to the player. In the present example, the player character carries the gun and the position corresponding to the player is the position of the gun carried by the player character.

In addition, the object is not particularly limited and is preferably an object that can favor the player in the progress of the video game. In the present example, the object is the bubble ejected from the gun.

Ejecting the object means moving an object in a predetermined position from the position. In the present example, a bubble is generated in the position of the gun carried by the player character based on ejection instruction operation of the player and is ejected.

The determination unit 12B has a function of determining, based on the positional relation between the ejected object and the predetermined region in the virtual space, whether to update the degree of uplift of the predetermined region.

The predetermined region in the virtual space means a region set in advance in the virtual space. In the present example, the predetermined region in the virtual space is the ground in a field provided in the three-dimensional virtual space.

Determining based on the positional relation between the object and the predetermined region means that a relation between the position of the object and the position of the predetermined region is used for at least part of processing. In the present example, when the bubble ejected from the gun carried by the player character hits the ground, it is determined to update the degree of uplift.

The degree of uplift of the predetermined region means a degree of uplift with respect to a reference surface of the predetermined region. In this example, the degree of uplift of the predetermined region is a degree of uplift with respect to the surface representing the shape of the ground at the start of the game on the ground in the field provided in the three-dimensional virtual space.

The update unit 13B has a function of, when it is determined to update the degree of uplift, referring to an uplift information storage that stores uplift information related to the degree of uplift of the predetermined region and updating the uplift information according to a first update rule related to the object and the predetermined region.

The uplift information means information related to the degree of uplift of the predetermined region. In the present example, the uplift information is includes the ground, unit regions set on the ground, and degrees of uplift of the unit regions in association with one another.

The first update rule means a rule related to the object and the predetermined region, the rule being used to update the uplift information. In the present example, the first update rule is a rule that a region of the predetermined range centering on the position of the ground where the bubble has landed changes to a region of the group of the player character that have ejected the bubble and uplifts.

Updating the uplift information means changing at least part of the uplift information. In the present example, the degree of uplift in the uplift information is updated. Note that, as an example of a configuration for updating the uplift information, there is a configuration for specifying coordinates in an update region to be updated and determining an update mode of the uplift information about each of the coordinates.

When it is determined to update the degree of uplift, the update unit 13B may update the uplift information according to the first update rule related to a combination of identification information of the player who has ejected the object or a group to which the player belongs and identification information of the player associated with the predetermined region in the uplift information or a group including the player.

The player who has ejected the object means a player who has performed operation for ejecting the object.

The first update rule here is a rule related to the combination of the identification information of the player who has ejected the object or the group to which the player belongs and the identification information of the player associated with the predetermined region in the uplift information or the group to which the player belongs. In the present example, the first update rule is a rule for determining update content of the uplift information based on a combination of identification information of a group to which the player who has ejected the bubble belongs and identification information of groups associated with the unit regions in the predetermined range centering on the position of the ground on which the bubble has landed.

When the kinds of identification information forming the combination are the same, the update unit 13B may update the uplift information comprises increasing the degree of uplift. When the kinds of identification information forming the combination are different, the update unit 13B may update the uplift information comprises decreasing the degree of uplift.

The combination means a combination of the identification information of the player who has ejected the object or the group to which the player belongs and the identification information of the player associated with the predetermined region in the uplift information or the group to which the player belongs. In the present example, the combination indicates a combination of the identification information of the group to which the player who has ejected the bubble belongs and the identification information of the groups associated with the unit regions in the predetermined range centering on the position of the ground where the bubble has landed.

The kinds of identification information forming the combination are the same means that the kinds of identification information of the player forming the combination are the same or the kinds of identification information of the group forming the combination are the same. In the present example, when the kinds of identification information forming the combination are the same, this indicates that the identification information of the group to which the player who has ejected the bubble belongs and the identification information of the groups associated with the unit regions in the predetermined range centering on the position of the ground where the bubble has landed are the same. Note that the update unit 13B may update the uplift information comprises increasing the degree when it is specified based on the identification information of the players forming the combination that the players belong to the same group.

When the kinds of identification information forming the combination are different, this means that the kinds of identification information forming the combination are not the same, that is, the kinds of identification information of the players forming the combination are not the same or the kinds of identification information of the groups forming the combination are not the same. In the present example, when the kinds of identification information forming the combination are the same, this indicates that the identification information of the group to which the player who has ejected the bubble belongs is different from the identification information of the groups associated with the unit regions in the predetermined range centering on the position of the ground where the bubble has landed.

The update unit 13B has a function of updating enemy character information of an enemy character with the ejected object.

The enemy character means a character that obstructs purpose achievement set by the player in the progress of the video game. In the present example, the enemy character is a player character of a group (another group) different from the group of the player character that has ejected the object. Note that the enemy character is not limited to the player character and may be a non-player character (NPC) set as an enemy.

The enemy character information means information used to control the enemy character. The enemy character information is not particularly limited but is preferably information including information related to the purpose achievement set by the player. In the present example, the enemy character information includes physical strength information of the player character. In the present example, when the bubble ejected from the gun carried by the player character lands on a player character of another group, the physical strength of the player character in the other group decreases. The player character of the other group whose physical strength is exhausted becomes incapable of acting for a fixed period of time.

The control unit 143 has a function of, after the uplift information is updated by the update unit 133, controlling a motion of the player is performed character on the predetermined region of the updated degree of uplift based on operation of the player.

The player character on the predetermined region means a player character located in the predetermined region. In the present example, the player character on the predetermined region is a player character standing on a region of its own group in the field.

The motion of the player character means that the motion is executable by the player character concerning the progress of the video game. In the present example, the player character can move on the uplifted ground. That is, a moving direction of the player character changes according to the uplifted of the ground. For example, since a high mountain is formed by the uplifted of the ground, the player character can climb up the mountain to secure a higher position than the other player characters. In this manner, the level of the position of the player character can be created by the player's own operation. In the present example, the player character can move faster in the region of the own group than in other types of regions.

The control unit 14B may control the motion of the player character is performed based on the degree of uplift of the predetermined region including the position of the player character.

Controlling based on the degree of uplift of the predetermined region including the position of the player character means that the degree of uplift of the predetermined region including the position of the player character is used for at least part of the processing. In the present example, the player character is capable of executing a specific attack on the uplifted region of the own group. The specific attack here is an attack by ejection of a huge bubble from the gun carried by the player character. The huge bubble more greatly lowers the degree of uplift compared with a normal bubble when the huge bubble lands on a region of the enemy group.

Next, an operation of a video game processing system 100B (a system 100B; not illustrated), which is an example of the system 100 (see FIG. 1) is explained. The system 100B includes a server 10B, In the following explanation, in order to simplify the explanation, processing executed by the server 10B and the terminal 20 are explained as being executed by the system 100B.

Figure 5:
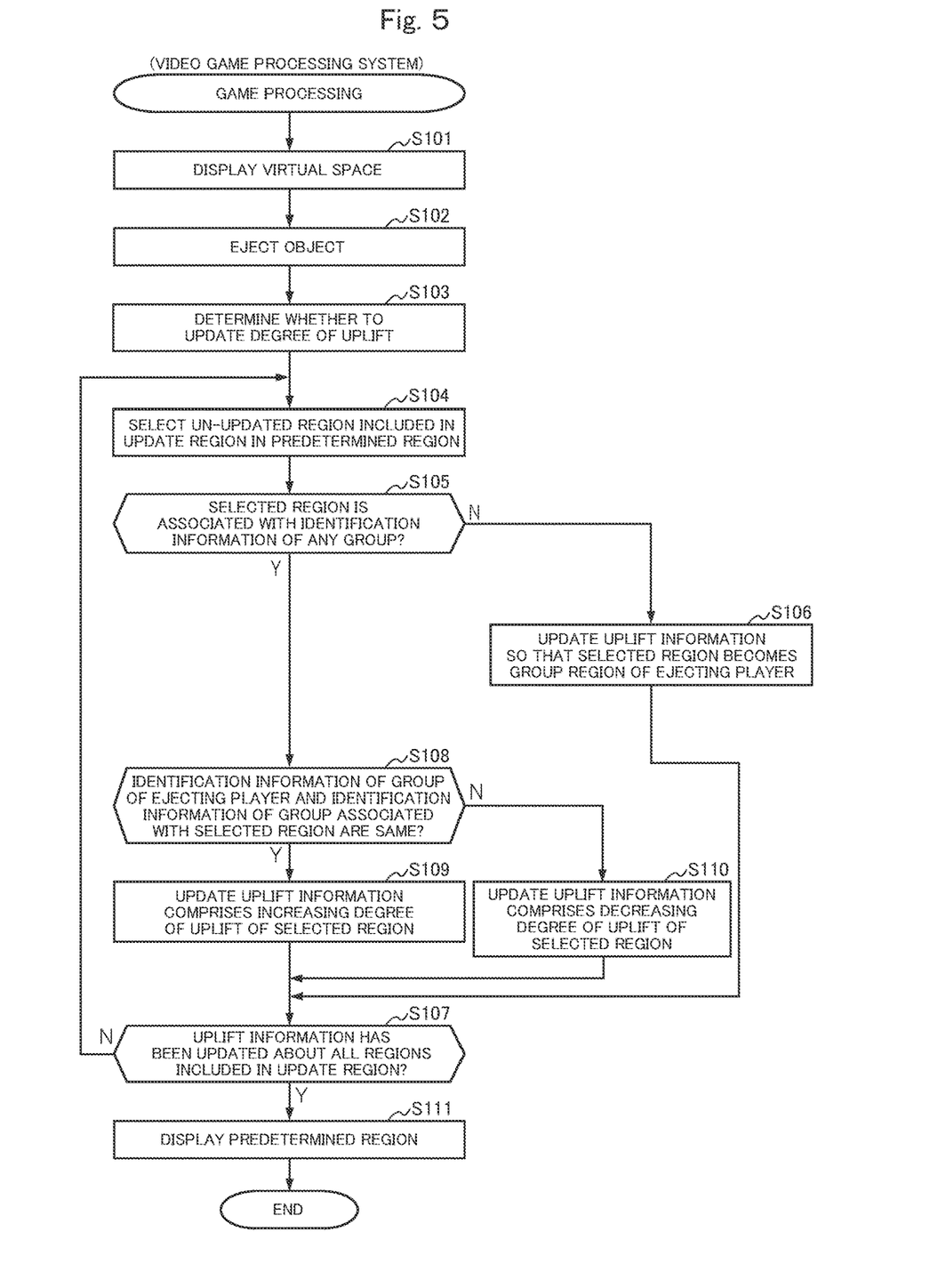
FIG. 5 is a flowchart illustrating an example of game processing corresponding to at least one of the embodiments of the present disclosure.

FIG. 5 is a flowchart illustrating an example of video game processing executed by the system 100B. In the game processing in the present example, processing related to controlling the progress of a video game according to operation of the player is performed. Respective kinds of processing are explained below. Note that the order of the respective kinds of processing is random as long as there is no contradiction or the like in processing content.

The game processing is started, for example, when the terminal 20 accessing the server 10B requests the server 10B to display a game screen.

In the game processing, first, the system 100B displays the virtual space (step S101). In the present example, the system 100B displays a three-dimensional virtual space on a predetermined display unit.

After displaying the virtual space, the system 100B ejects the object from the position corresponding to the player in the virtual space based on operation of the player (step S102). In the present example, the system 100B ejects, based on the operation of the player, the object from the position of the player character in a direction in which the player character faces.

After ejecting the object, the system 100B determines, based on a positional relation between the ejected object and the predetermined region in the virtual space, whether to update the degree of uplift of the predetermined region (step S103). In the present example, the system 100B determines to update the degree of uplift when the bubble ejected from the gun carried by the player character hits the ground.

When determining to update the degree of uplift of the predetermined region, the system 100B selects an un-updated region in the update region in the predetermined region (step S104). In the present example, the system 100B selects a unit region in which the uplift information is not updated among unit regions included in the predetermined range centering on the position of the ground where the bubble has landed.

After selecting the un-updated region, when the selected region is not a region of any group (step S105, N), the system 100B updates the uplift information so that the selected region becomes a group region of the ejecting player who has caused the player character to eject the bubble (step S106) and proceeds to step S107. In the present example, the system 100B associates identification information of the group with the selected region anew and further updates the uplift information comprises increasing the degree of uplift by a predetermined value.

After selecting the un-updated region, when the selected region is a region of any group (Step S105, Y) and when the identification information of the group of the ejecting player and the identification information of the group associated with the selected region are the same (Step S108, Y), the system 100B updates the uplift information comprises increasing the degree of uplift of the selected region (step S109) and proceeds to step S107. In the present example, the system 100B updates the uplift information comprises increasing the degree of uplift of the selected region by the predetermined value.

After selecting the un-updated region, when the selected region is a region of any group (Step S105, Y) and when the identification information of the group of the ejecting player and the identification information of the group associated with the selected region are not the same (Step S108, N), the system 100B updates the uplift information comprises decreasing the degree of uplift of the selected region (step S110) and proceeds to step S107. In the present example, the system 100B updates the uplift information comprises decreasing the degree of uplift of the selected region by the predetermined value. Note that, when the degree of uplift is reduced to zero by decreasing the degree of uplift of the selected region by the predetermined value, the uplift information is updated so that the selected region does not belong to any group or becomes a group region of the ejecting player.

The system 100B updates the uplift information and, when the uplift information has not been updated about all of regions included in the update region (Step S107, N) returns to step S104. On the other hand, the system 100B updates the uplift information and, when the uplift information has been updated about all of the regions included in the update region (Step S107, Y), displays the predetermined region based on the updated uplift information (step S111). In the present example, the system 100B displays the ground of the field set in the three-dimensional virtual space on the predetermined display unit based on the updated uplift information.

After displaying the predetermined region based on the updated uplift information, the system 100B ends the processing here.

Figure 6A:
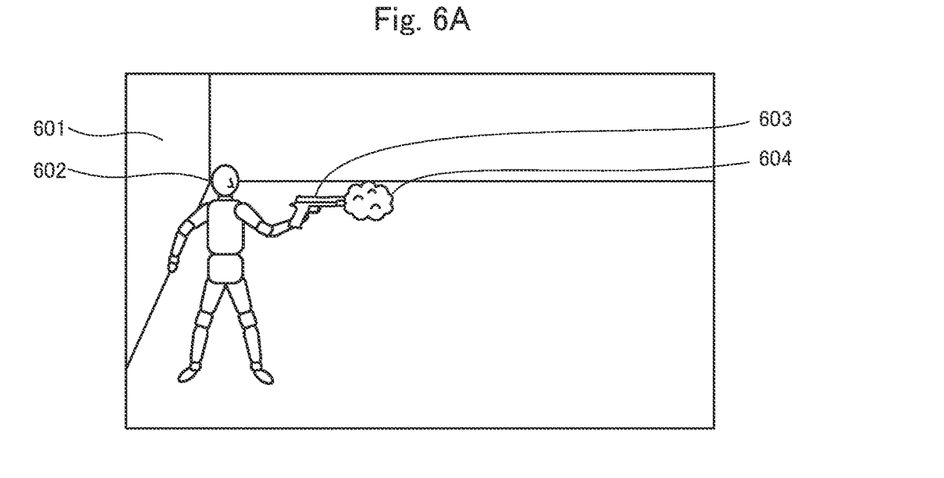
FIGS. 6A to 6C are explanatory diagrams illustrating an example of a game screen corresponding to at least one of the embodiments of the present disclosure.
Figure 6B:
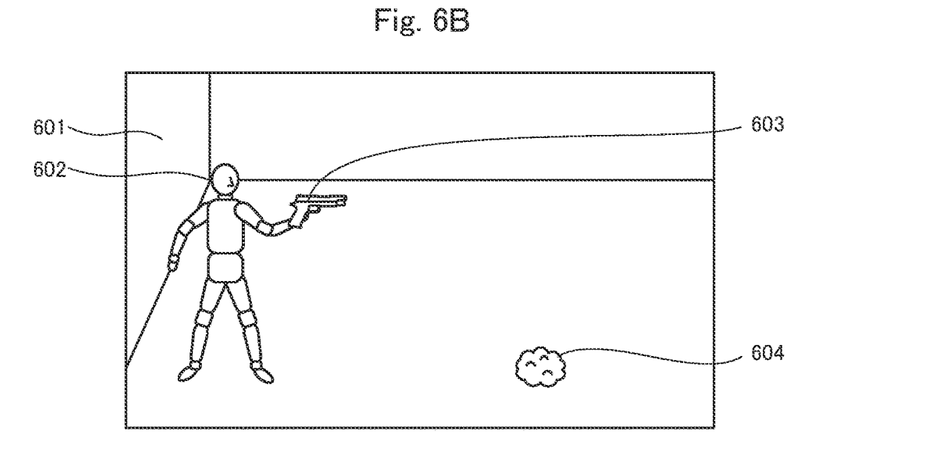
Figure 6C:
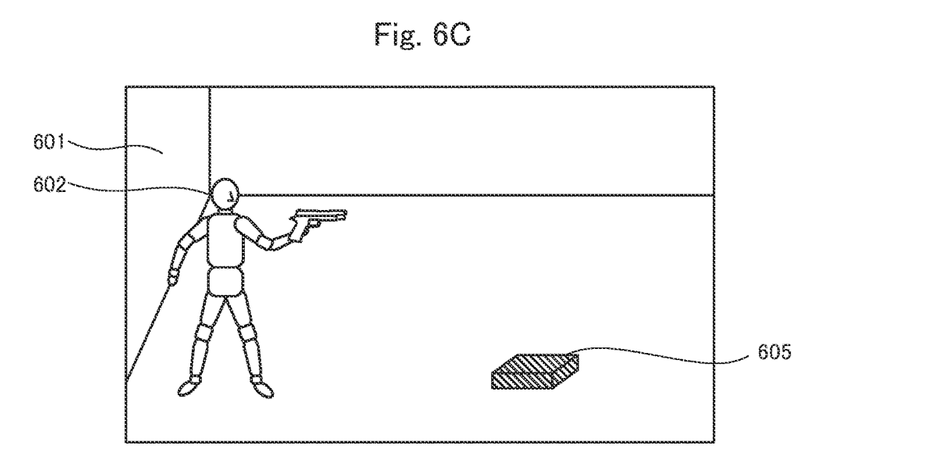

FIGS. 6A to 6C are explanatory diagrams for explaining an example of a game screen. The game screen illustrated in FIGS. 6A to 6C is a display screen of a three-dimensional virtual space.

FIG. 6A is a game screen diagram at the time when a bubble is ejected from a gun based on ejection instruction operation of a player. On the game screen of FIG. 6A, a three-dimensional virtual space 601, a player character 602, a gun 603, and a bubble 604 are illustrated.

The three-dimensional virtual space 601 is a virtual space used for the progress of a video game. In the three-dimensional virtual space 601, the player character 602, the gun 603, and the bubble 604 are appropriately arranged.

The player character 602 is a character whose motion is controlled based on operation of the player. For example, the player character 602 moves in the three-dimensional virtual space 601 based on movement instruction operation of the player.

The gun 603 is carried by the player character 602. In FIGS. 6A to 6C, only the gun 603 is displayed as being carried by the player character 602. However, naturally, the player character 602 may carry a plurality of weapons.

The bubble 604 is ejected based on the ejection instruction operation of the player. After being generated in a muzzle position of the gun 603 in response to the ejection instruction operation of the player, the bubble 604 falls toward the ground while moving in a direction in which the player character 602 faces.

FIG. 6B is a game screen diagram at the time when the bubble 604 is ejected and lands on the ground. As illustrated in FIG. 6B, the ejected bubble 604 lands on the ground after falling toward the ground while moving by a predetermined distance in the direction in which the player character faces.

FIG. 6C is a game screen diagram at the time when the ground uplifted. In FIG. 6B, a predetermined range centering on a landing position of the bubble 604 changes to a region of a group of the player character 602 and uplifted. In FIG. 6C, an uplift region 605 is illustrated. The center position of the uplift region 605 is the landing position of the bubble 604. The uplift region 605 is displayed so that the player can identify the region as a region of a group of the player character 602.

Figure 7A:
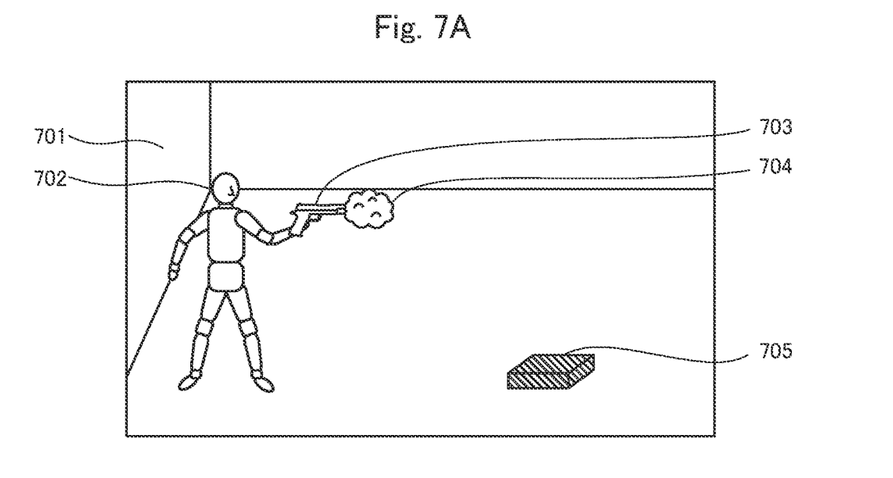
FIGS. 7A to 7C are explanatory diagrams illustrating an example of a game screen corresponding to at least one of the embodiments of the present disclosure.
Figure 7B:
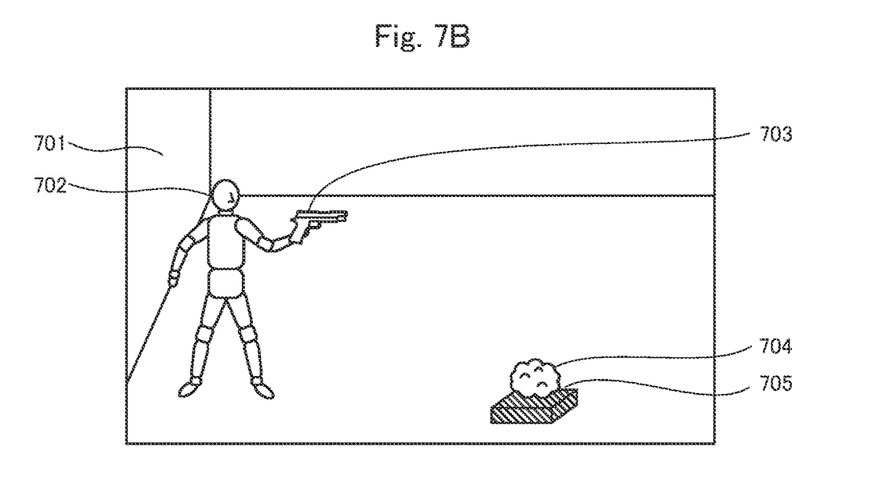
Figure 7C:
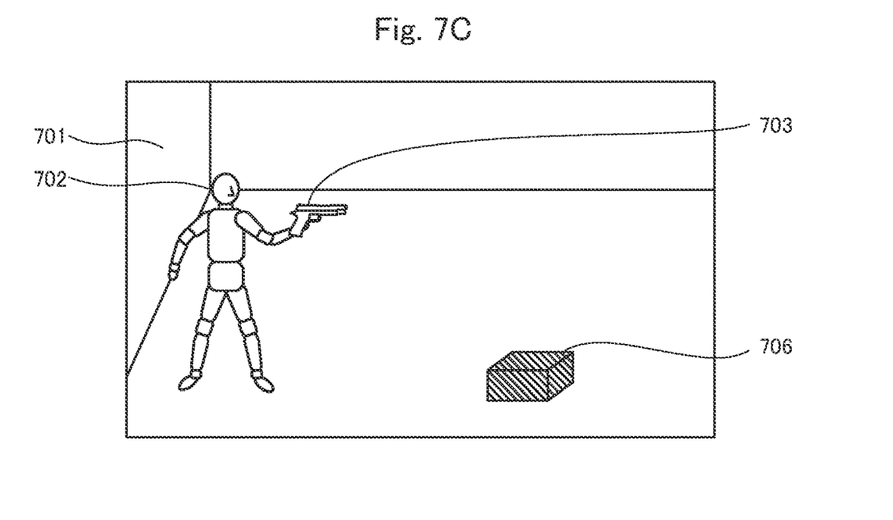

FIGS. 7A to 7C are explanatory diagrams for explaining an example of a game screen. The game screen illustrated in FIGS. 7A to 7C is a display screen of a three-dimensional virtual space.

FIG. 7A is a game screen view at the time when a bubble is ejected from a gun based on ejection instruction operation of a player. In the game screen of FIG. 7A, a three-dimensional virtual space 701, a player character 702, a gun 703, a bubble 704, and an uplift region 705 are illustrated. Since the three-dimensional virtual space 701 to the bubble 704 correspond to the three-dimensional virtual space 601 to the bubble 604 in FIGS. 6A to 6C, explanation thereof is omitted.

FIG. 7B is a game screen diagram at the time when the bubble 704 is ejected and lands on the uplift region 705.

FIG. 7C is a game screen diagram at the time when the uplift region 705 uplifts higher. A high uplift region 706 is a further uplift region of the uplift region 705 on which the bubble 704 lands in FIG. 7B. An uplift degree can be increased by causing the bubble to land on the uplift region of the own group in this way.

Figure 8A:
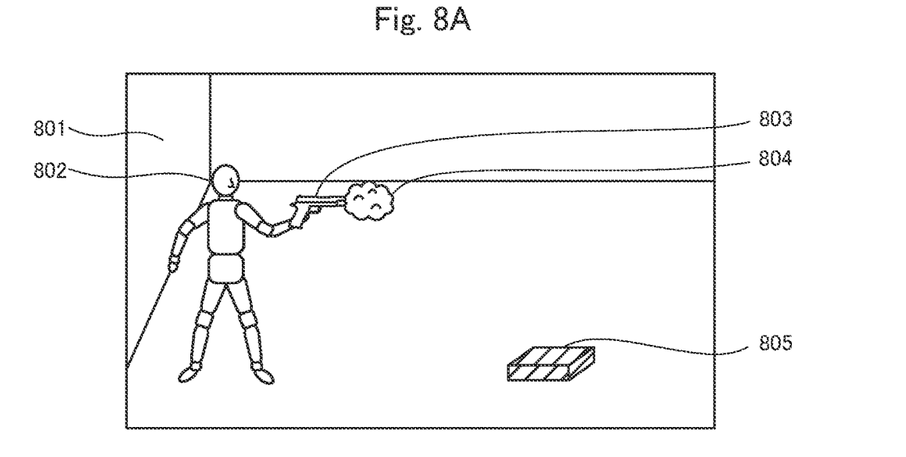
FIGS. 8A to 8C are explanatory diagrams illustrating an example of a game screen corresponding to at least one of the embodiments of the present disclosure.
Figure 8B:
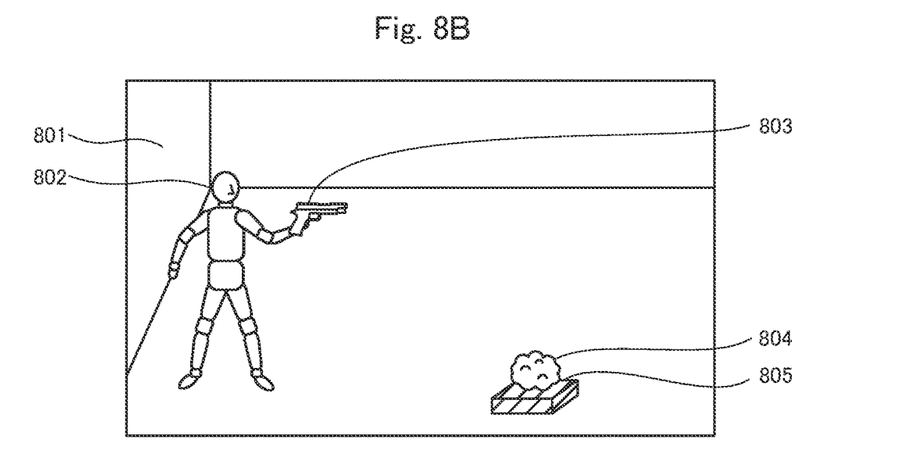
Figure 8C:
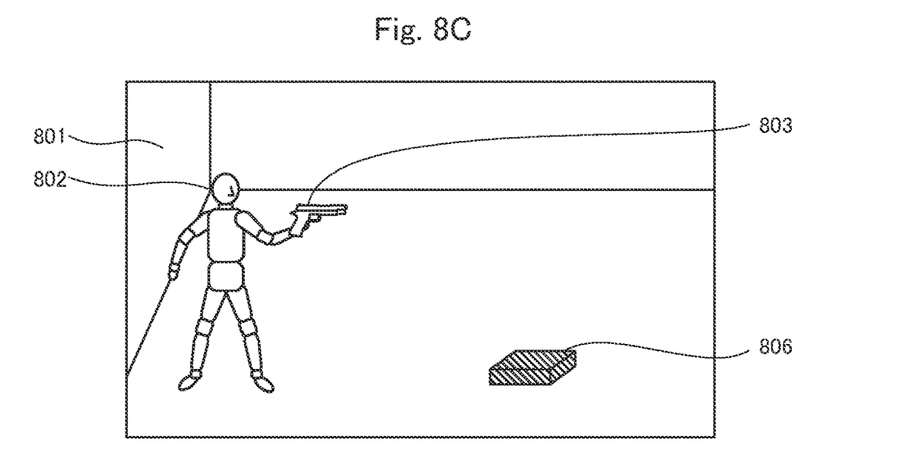

FIGS. 8A to 8C are explanatory diagrams for explaining an example of a game screen. The game screen illustrated in FIGS. 8A to 8C is a display screen of a three-dimensional virtual space.

FIG. 8A is a game screen diagram at the time when a bubble is ejected from a gun based on ejection instruction operation of a player. In the game screen of FIG. 8A, a three-dimensional virtual space 801, a player character 802, a gun 803, a bubble 804, and an uplift region 805 are illustrated. Since the three-dimensional virtual space 801 to the bubble 804 correspond to the three-dimensional virtual space 601 to the bubble 604 in FIGS. 6A to 6C, the description thereof is omitted.

The uplift region 805 is a region of a group different from a group of the player character 802. The uplift region 805 is displayed so that the player can identify that the uplift region 805 is a region of a group different from the uplift region 605 illustrated in FIGS. 6A to 6C and the uplift region 706 illustrated in FIGS. 7A to 7C.

FIG. 8B is a game screen diagram at the time when the bubble 804 is ejected and lands on the uplift region 805.

FIG. 8C is a game screen diagram at the time when the uplift region 805 changes to an uplift region 806. In FIG. 8B, the uplift region 805, which is a landing destination of the bubble 804, changes to the uplift region 806 of a group of the player character 802. The change from the uplift region 805 to the uplift region 806 is caused because a degree of uplift of the uplift region 805 is lowered by the bubble 804 to be 0, and degree of uplift of an uplift region of the group of player character 802 increases. In this way, by causing the bubble to land on an uplift region of an enemy group, a degree of uplift of the region can be lowered and changed to an uplift region of the player's own group. Therefore, it is possible to provide amusement of competing for the uplift region.

Note that, in the example illustrated in FIGS. 8A to 8C, the bubble is caused to land to lower the degree of uplift of the uplift region 805 and the uplift region 805 finally changes to the uplift region 806. However, depending on the degree of uplift of the uplift region 805 and a degree of I decreasing of the uplift degree, for example, it could occur that the degree of uplift of the uplift region 805 merely lowers.

Figure 9:
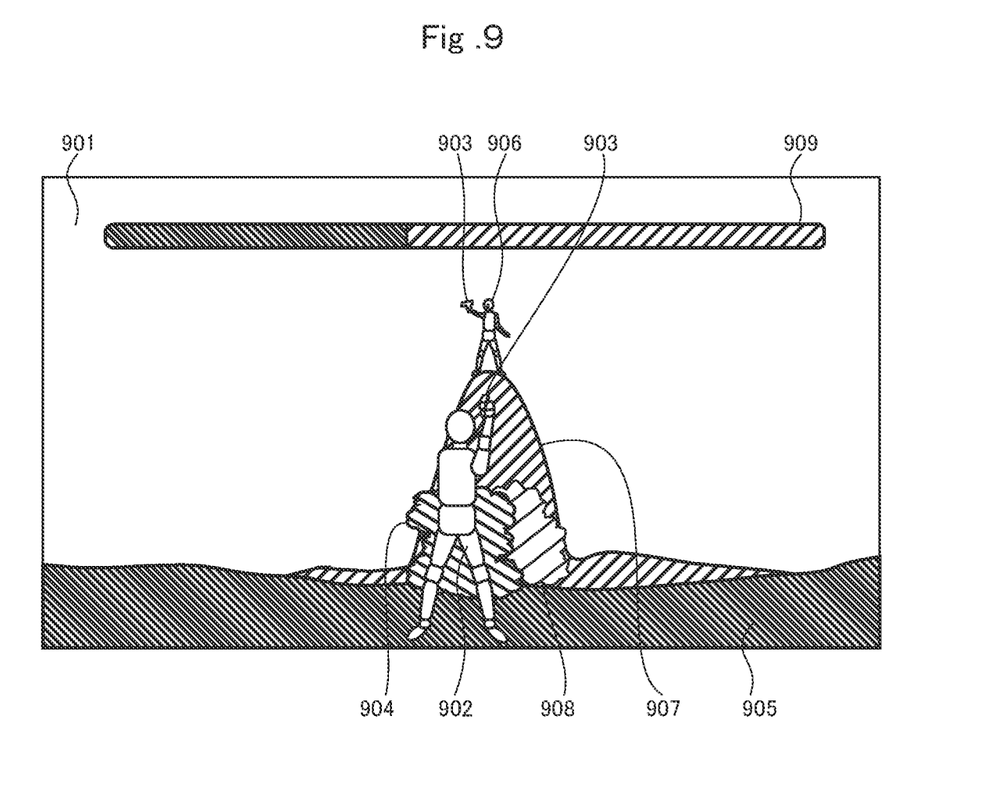
FIG. 9 is an explanatory diagram illustrating an example of a game screen corresponding to at least one of the embodiments of the present disclosure.

FIG. 9 is an explanatory diagram for explaining an example of a game screen. The game screen illustrated in FIG. 9 is a display screen of a three-dimensional virtual space.

In FIG. 9, a player character 902 and a player character 906 in a three-dimensional virtual space 901 are respectively characters of players carrying guns 903 and belonging to different groups from each other.

In FIG. 9, a bubble 904 is ejected from the gun 903 carried by the player character 902. An uplift region 905 of the player character 902 is formed. Similarly, a bubble 908 is ejected from the gun 903 carried by the player character 906 and an uplift region 907 of the player character 906 is formed. The uplift region 905 and the uplift region 907 are respectively associated with identification information of the groups and are uplifted by bubbles ejected from the guns carried by the player characters of the groups.

A part where the player character 906 is located in the uplift region 907 has a higher degree of uplift compared with the uplift region 905. That is, the player character 906 is located in a higher place compared with the player character 902. This is due to the bubble ejected from the gun 903 of the player character 906. In this way, it is possible to create a height difference of the ground of a field according to the intention of the player. The height difference can lead to advantages and disadvantages due to a difference in terrain between the players.

A gauge 909 is a gauge indicating superiority and inferiority of two groups. The gauge 909 visually shows a result of comparing the sums of degrees of uplift of regions (the volumes of mountains formed by uplift of the ground).

As explained above, as one aspect of the second embodiment, the server 10B that controls the progress of the video game according to operation of the player includes the ejection unit 11B, the determination unit 12B, and the update unit 13B. Therefore, it is possible to eject the object from the position corresponding to the player in the virtual space based on operation of the player, determine, based on the positional relation between the ejected object and the predetermined region in the virtual space, whether to update the degree of uplift of the predetermined region and, when it is determined to update the degree of uplift, refer to an uplift information storage storing the uplift information related to the degree of uplift of the predetermined region, update the uplift information according to the first update rule related to the object and the predetermined region, and improve amusement of the video game.

That is, since the predetermined region of the virtual space can be changed according to the intention of the player, the virtual space becomes rich in variation, and as a result, amusement of the video game can be improved. For example, since the position to which the player can move in the virtual space can be changed by the intention of the player according to the uplift of the predetermined region, consideration about the change is added as an element of the game play, and as a result, amusement of the video game can be improved.

Besides, compared with when the position to which the player can move in the virtual space is changed by a method of leaving the ejected object in the virtual space, since it is unnecessary to leave the object in the virtual space, the number of objects to be processed simultaneously is reduced. As a result, a processing load of the video game can be reduced.

In the example of the second embodiment explained above, the server 10B functioning as the control unit 14B controls the motion of the player character is performed on the predetermined region based on operation of the player after the degree of uplift is updated by the update unit 13B and enables the motion of the player character on the predetermined region where the degree of uplift has changed. Therefore, it is possible to give the player stronger motivation for changing the degree of uplift with the object.

In the example of the second embodiment explained above, the server 10B functioning as the control unit 14B controls the operation of the player character based on the degree of uplift of the predetermined region including the position of the player character. A change of the predetermined region due to the intention of the player also affects the motion of the player character. As a result, it is possible to further improve the amusement of the video game.

In the example of the second embodiment explained above, the server 10B functioning as the update unit 13B refers to updates the uplift information of the predetermined region is performed according to the second update rule related to the motion of the player character and the predetermined region including, the uplift information of the predetermined region including the position of the player character. The relation between the ejection of the object and the motion of the player character is more complicated. As a result, it is possible to further improve the amusement of the video game.

In the example of the second embodiment explained above, the uplift information includes the predetermined region, the degree of uplift, and the identification information of the player or the group including the player in association. When it is determined that the degree of uplift is updated, the server 10B functioning as the update unit 13B updates the uplift information according to the first update rule related to the combination of the identification information of the player who has ejected the object or the group to which the player belongs and the identification information of the player or the group to which the player belongs associated with the predetermined region in the uplift information. A situation of the association of the predetermined region and the identification information is related to the update of the degree of uplift by the object. Therefore, for example, it is possible to easily cause a change in the degree of uplift due to the ejection of the object to act to be advantageous for the player himself/herself who has ejected the object or to act to be disadvantageous for an opponent (a player or an NPC of the opponent) of the player. As a result, it is possible to further improve the amusement of the video game.

In the example of the second embodiment explained above, the server 10B functioning as the update unit 13B updates the uplift information to raise the degree of uplift when the kinds of identification information forming the combination are the same and updates the uplift information comprises decreasing the degree of uplift when the kinds of identification information forming the combination are different. It is possible to improve amusement of a battle game or a cooperative game, for example, by competing for the degrees of uplift of the regions of the players or the groups.

In the example of the second embodiment explained above, the server 10B functioning as the update unit 13B updates the enemy character information of the enemy character with the ejected object and complicates the progress of the video game while preventing an increase in types of operation of the player. As a result, it is possible to further improve the amusement of the video game.

Note that the video game in the present example is an action shooting game but a genre of the video game is not limited to this. The groups of the video game players battle against each other in the present example. However, naturally, the video game is not limited to this and may be, for example, a game in which players battle against NPCs in cooperation with each other or a game in which mixed groups of players and NPCs may battle against each other. The video game may be a game in which a single player or NPC and a group battle against each other.

As explained above, one or two or more deficiencies are solved by the embodiments of the present application. Note that the effects by the respective embodiments are examples of non-limiting effects or effects.

Note that, in the embodiments explained above, the plurality of player terminals 20 and 201 to 20N and the server 10 execute the various kinds of processing explained above according to various control programs (for example, a video game processing program) stored in storage devices included in the player terminals themselves.

The configuration of the system 100 is not limited to the configurations as the examples of the embodiments explained above and may be, for example, a configuration in which the server 10 executes a part or all of the processing explained as the processing executed by the player terminal or may be a configuration in which any one (for example, the player terminal 20) of the plurality of player terminals 20 and 201 to 20N executes a part or all of the processing explained as the processing executed by the server 10. The configuration of the system 100 may be a configuration in which a part or the entire storage included in the server 10 may be included in any one of the plurality of player terminals 20 and 201 to 20N. That is, a part or all of the functions included in one of the player terminal 20 and the server 10 in the system 100 may be included in the other.

A program may be configured to cause a single device not including a communication network to realize a part or all of the functions explained as the examples of the embodiments explained above.

INDUSTRIAL APPLICABILITY

One of embodiments of the present invention is useful for enabling improvement of amusement of a video game.

APPENDIX

In the above explanation of the embodiments, at least the following embodiments are described so that a person having ordinary knowledge in the field to which the invention belongs can carry out the embodiments.

[1]

A non-transitory computer-readable medium storing a video game processing program for causing a server to perform functions comprising:

controlling progress of a video game according to an operation of a player;

ejecting an object from a position corresponding to the player in a virtual space based on the operation of the player;

determining whether to update a degree of uplift of a predetermined region based on a positional relation between the ejected object and the predetermined region in the virtual space;

referring to a storage storing uplift information related to the degree of uplift of the predetermined region, when it is determined to update the degree of uplift; and updating the uplift information according to a first update rule related to the object and the predetermined region.

[2]

The non-transitory computer-readable medium according to [1], wherein the controlling a motion of a player character on the predetermined region based on the operation of the player after the uplift information is updated.

[2-1]

The non-transitory computer-readable medium according to [2], wherein the controlling the motion of the player character is performed based on the degree of uplift of the predetermined region including a position of the player character.

[2-2]

The non-transitory computer-readable medium according to [2-1], wherein referring to the storage and updating the uplift information of the predetermined region is performed according to a second update rule related to the motion of the player character and the predetermined region including, the uplift information of the predetermined region including the position of the player character.

[3]

The non-transitory computer-readable medium according to [1] or [2], wherein the uplift information includes the predetermined region, the degree of uplift, and identification information of the player or a group including the player in association, and wherein updating the uplift information, uplift information is performed according to the first update rule related to a combination of identification information of a player who has ejected the object or a group including the player and identification information of a player associated with the predetermined region in the uplift information or a group including the player, when it is determined to update the degree of uplift.

[3-1]

The non-transitory computer-readable medium according to [3], wherein the updating the uplift information comprises the degree of uplift when the kinds of identification information forming the combination are the same and wherein updating the uplift information comprises decreasing the degree of uplift when the kinds of identification information forming the combination are different.

[4]

The non-transitory computer-readable medium according to any one of [1] to [3], further causing the server to realize further comprising updating enemy character information of an enemy character with the ejected object.

[5]

A non-transitory computer-readable medium including a video game processing program for causing a player terminal to perform at least one function of the functions that the video game processing program described in any one of [1] to [4] causes the server to perform, the user terminal being capable of communicating with the server.

[6]

A video game processing system comprising:
a communication network,
a server,
a player terminal;
one or more processors configured to:
control progress of a video game according to an operation of a player,
eject an object from a position corresponding to the player in a virtual space based on the operation of the player;
determine whether to update a degree of uplift of a predetermined region based on a positional relationship between the ejected object and a predetermined region in the virtual space; and
when it is determined to update the degree of uplift, refer to a storage storing uplift information related to the degree of uplift of the predetermined region; and
update the uplift information according to a first update rule related to the object and the predetermined region.

[7]

The video game processing system according to [6], wherein the processors in the server configured to:
control progress of the video game according to the operation of the player;
eject the object from the position corresponding to the player in the virtual space based on the operation of the player;
determine whether to update the degree of uplift of the predetermined region based on the relationship; and
when it is determined to update the degree of uplift, refer to the storage; and
update the uplift information according to the first update rule related to the object and the predetermined region, and the processors in the player terminal configured to output a game screen representing a state of the virtual space with a display unit to a display screen of a display device.

[8]

A non-transitory computer-readable medium storing a video game processing program for causing a player terminal to perform functions comprising controlling progress of a video game according to an operation of a player;
ejecting an object from a position corresponding to the player in a virtual space based on the operation of the player;
determining whether to update a degree of uplift of a predetermined region based on a positional relation between the ejected object and the predetermined region in the virtual space;
referring to a storage storing uplift information related to the degree of uplift of the predetermined region, when it is determined to update the degree of uplift; and
updating the uplift information according to a first update rule related to the object and the predetermined region.

[9]

A non-transitory computer-readable medium storing a video game processing program for causing a player terminal to perform functions comprising:

controlling progress of a video game according to an operation of a player;
ejecting object from a position corresponding to the player in a virtual space based on the operation of the player;
determining whether to update a degree of uplift of a predetermined region based on a positional relationship between the ejected object and the predetermined region in the virtual space
referring to an uplift information storage storing uplift information related to the degree of uplift of the predetermined region, when it is determined to update the degree of uplift; and
updating the uplift information according to a first update rule related to the object and the predetermined region.

[10]

A video game processing method in which a video game processing system including a communication network, a server, and a player terminal controls progress of a video game according to an operation of a player, the video game processing method comprising:
- ejection processing for ejecting an object from a position corresponding to the player in a virtual space based on the operation of the player;
- determination processing for determining whether to update a degree of uplift of a predetermined region based on a positional relation between the ejected object and the predetermined region in the virtual space;
- refer to an uplift information storage storing uplift information related to the degree of uplift of the predetermined region and update the uplift information according to a first update rule related to the object and the predetermined region.

What is claimed is:

1. A non-transitory computer-readable medium storing thereon a video game processing program which, when executed, causes a server to perform functions comprising:
- controlling progress of a video game according to an operation of a player;
- ejecting an object from a position corresponding to the player in a virtual space based on the operation of the player;
- determining whether to update a degree of uplift of a predetermined region based on a positional relationship between the ejected object and the predetermined region in the virtual space, the predetermined region including at least part of a ground which the ejected object contacts in the virtual space;
- referring to a storage storing uplift information related to the degree of uplift of the predetermined region, when it is determined to update the degree of uplift; and
- updating the uplift information according to a first update rule related to the object and the predetermined region.

2. The non-transitory computer-readable medium according to claim 1, wherein the functions further comprise controlling a motion of a player character on the predetermined region based on the operation of the player after the uplift information is updated.

3. The non-transitory computer-readable medium according to claim 2, wherein controlling the motion of the player character is performed based on the degree of uplift of the predetermined region including a position of the player character.

4. The non-transitory computer-readable medium according to claim 3, wherein updating the uplift information of the predetermined region is performed according to a second update rule related to the motion of the player character and the predetermined region including the position of the player character.

5. The non-transitory computer-readable medium according to claim 1,
wherein the uplift information includes the predetermined region, the degree of uplift, and identification information of the player or a group including the player in association, and
wherein updating the uplift information is performed according to the first update rule related to a combination of identification information of a player who has ejected the object or a group including the player and identification information of a player associated with the predetermined region in the uplift information or a group including the player, when it is determined to update the degree of uplift.

6. The non-transitory computer-readable medium according to claim 5,
wherein updating the uplift information comprises increasing the degree of uplift when the kinds of identification information forming the combination are the same, and
wherein updating the uplift information comprises decreasing the degree of uplift when the kinds of identification information forming the combination are different.

7. The non-transitory computer-readable medium according to claim 1, further comprising updating enemy character information of an enemy character with the ejected object.

8. A video game processing system, comprising:
- a communication network;
- a server;
- a player terminal; and
- one or more processors configured to:
  - control progress of a video game according to an operation of a player,
  - eject an object from a position corresponding to the player in a virtual space based on the operation of the player;
  - determine whether to update a degree of uplift of a predetermined region based on a positional relationship between the ejected object and the predetermined region in the virtual space, the predetermined region including at least part of a ground which the ejected object contacts in the virtual space; and
  - when it is determined to update the degree of uplift, refer to a storage storing uplift information related to the degree of uplift of the predetermined region; and
  - update the uplift information according to a first update rule related to the object and the predetermined region.

9. A non-transitory computer-readable medium storing thereon a video game processing program which, when executed, causes a player terminal to perform functions comprising:
- controlling progress of a video game according to an operation of a player;
- ejecting an object from a position corresponding to the player in a virtual space based on the operation of the player;
- determining whether to update a degree of uplift of a predetermined region based on a positional relationship between the ejected object and the predetermined region in the virtual space, the predetermined region including at least part of a ground which the ejected object contacts in the virtual space;
- referring to a storage storing uplift information related to the degree of uplift of the predetermined region, when it is determined to update the degree of uplift; and
- updating the uplift information according to a first update rule related to the object and the predetermined region.

10. The non-transitory computer-readable medium according to claim 1, wherein the at least part of the ground includes an uplift region, and the uplift includes further uplift of the uplift region.

* * * * *